T. NESOM.
POWER TRANSMISSION ATTACHMENT FOR AUTOMOBILES.
APPLICATION FILED FEB. 6, 1911.
1,039,177.
Patented Sept. 24, 1912.
2 SHEETS—SHEET 1.
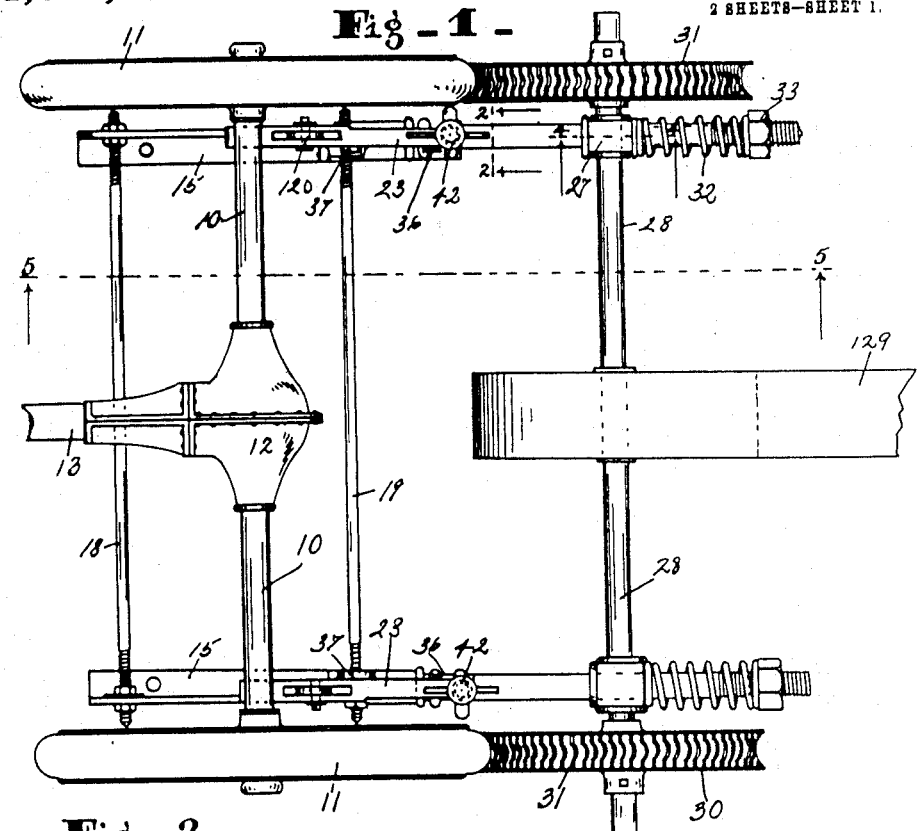
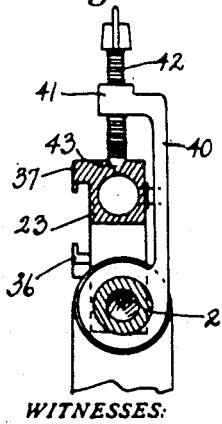
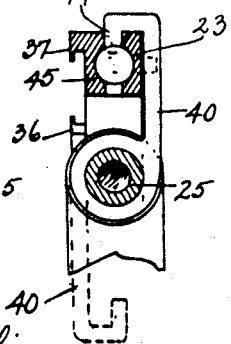
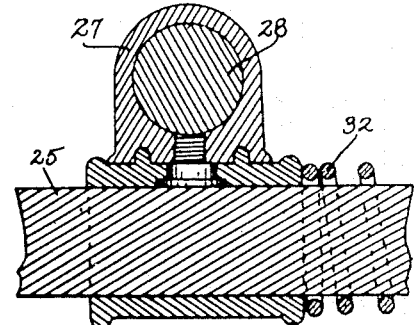
WITNESSES:
O. M. McLaughlin
W. M. Gentle
INVENTOR.
Thomas Nesom.
BY
V. H. Lockwood
ATTORNEY.

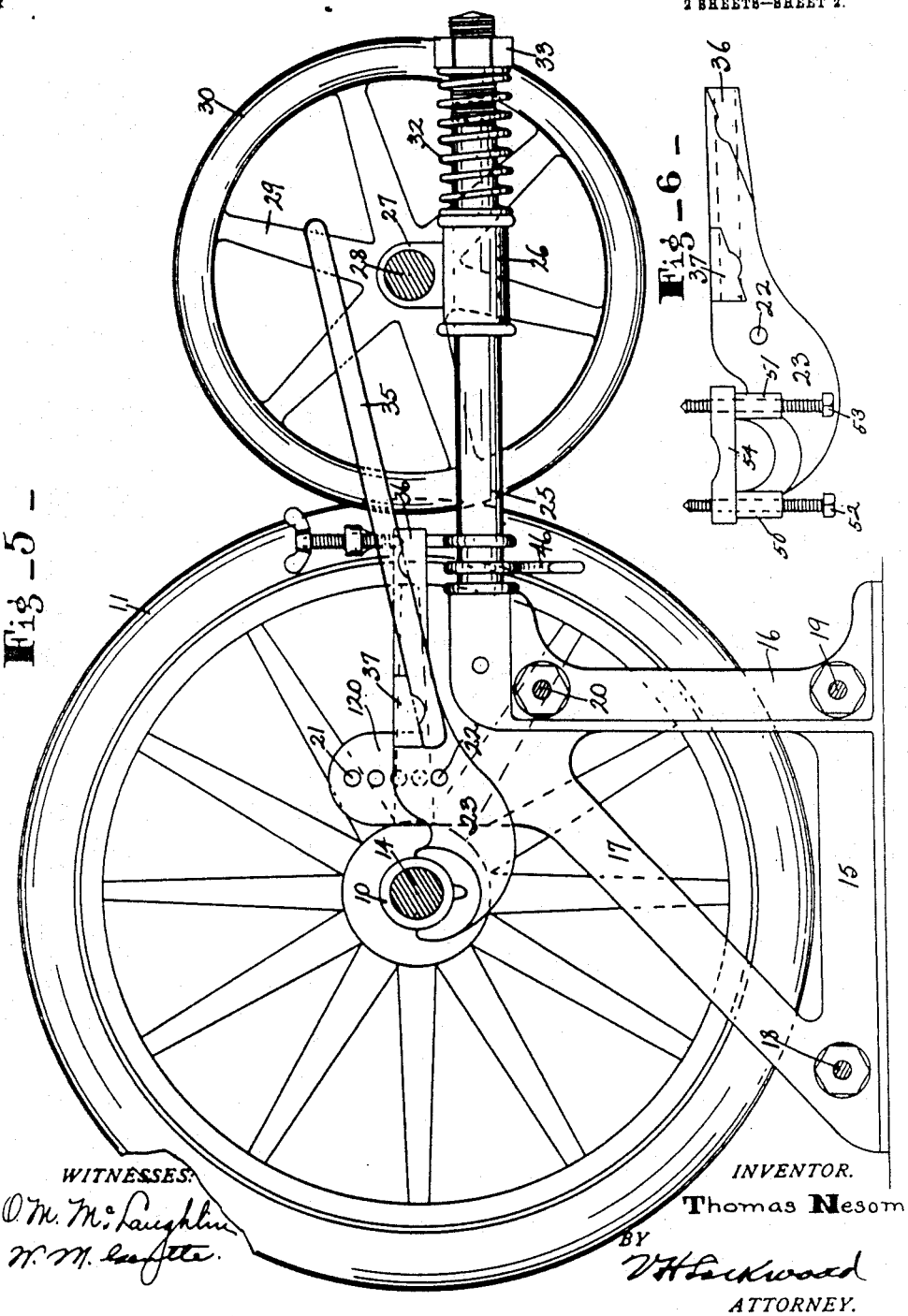

UNITED STATES PATENT OFFICE.

THOMAS NESOM, OF INDIANAPOLIS, INDIANA.

POWER-TRANSMISSION ATTACHMENT FOR AUTOMOBILES.

1,039,177. Specification of Letters Patent. Patented Sept. 24, 1912.

Application filed February 6, 1911. Serial No. 606,694.

*To all whom it may concern:*

Be it known that I, THOMAS NESOM, of Indianapolis, county of Marion, and State of Indiana, have invented a certain useful Power-Transmission Attachment for Automobiles; and I do hereby declare that the following is a full, clear, and exact description thereof, reference being had to the accompanying drawings.

The object of this invention is to provide suitable mechanism to be used in combination with an automobile for the purpose of transmitting power from the automobile to other machinery. Thus, a farmer, by means of this invention, could use his automobile to drive various agricultural machines and devices, particularly when it is desired to run them for only a short time, such as a cider mill, corn sheller, wood saw, and the like. Incidentally the device may be used also for lifting the rear automobile wheels off the ground, so that it may be run long enough to get the engine well started.

The nature of the invention will be understood from the accompanying drawings and the following description and claims.

In the drawings Figure 1 is a plan view of said device combined with the rear part of the chassis of an automobile, the driving belt of said device being partly broken away. Fig. 2 is a section on the line 2—2 of Fig. 1. Fig. 3 is a modified form of Fig. 2. Fig. 4 is a section on the line 4—4 of Fig. 1 on a larger scale. Fig. 5 is a section on the line 5—5 of Fig. 1, but on a larger scale. Fig. 6 shows a modified form of the lever shown in Figs. 1 and 5.

There is shown the rear tubular axle 10 of an automobile and the rear wheels 11 thereof driven by the shaft 14 and other means inclosed in the tubular axle and the parts 12 and 13, which, however, is not entirely illustrated. So far as this invention is concerned, it is immaterial how the wheels of the automobile are driven, or which wheels, whether front or rear, as the device may be applied to either the front or rear wheels.

A frame, the length of which is substantially equal to the width of the automobile, is provided, and it is triangular in cross section, consisting of end portions having a bottom horizontal part 15, a vertical part 16 at the rear, and an inclined brace portion 17. The two triangular portions at each end are connected by cross rods 18, 19 and 20 for spacing them and holding them upright. They are arranged so that the frame as a whole can be put in place between the rear wheels of an automobile and the triangular ends of the frame will be near the wheels. An upward projection 120 extends from each triangular end of said frame and is provided with a number of holes 21 through which a pin 22 for fulcruming the lever 23 may be inserted. There is a lever 23 at each end of the frame and the inner end of each lever is formed so as to engage the underside of the axle 10 near the wheel and support and lift said axle. The elevation of the lever 23 can be adjusted by reason of the holes 21 to suit axles of varying elevations.

From each triangular end frame near the top, there is a rearwardly extending tube or rod 25, and on each rod there is a sliding sleeve 26 carrying a swiveled bearing 27 for the shaft 28 which extends from one rod 25 to the other and carries a pulley 29 for a belt 129, whereby power can be transmitted to any other machine or device. There is mounted on each end of said shaft 28 a friction wheel 30 with a concave periphery adapted to engage the convex periphery of the adjacent rear automobile wheels and be actuated thereby. The periphery of the friction wheels are provided with transverse corrugations 31 to give the rubber of the automobile wheels a better grip, or to increase the coefficient of friction between the wheels 11 and 30. The friction wheels 30 are held snugly against the tires of the automobile traction wheels 11 by springs 32 surrounding the rods or tubes 25, and the tension thereof is adjusted by the nuts 33 on the threaded portions of the rod 25.

When the device is put in place behind an automobile, the levers 23 are actuated for lifting the axle of the automobile by removable bars 35. These may be straight bars of iron fulcrumed on flanges 36 on the inner surfaces of the rear ends of the levers 23, and the front ends of the bars 35 catch under projections 37 near the upper edges of the levers 23 between the fulcrums 36 and the pivot pin 22. This enables the bars 35 to be used and the leverage increased. When the automobile axle is elevated so the wheels are off the ground, the rear ends of the levers 23 are held down for holding the wheels and axles elevated by brackets 40 which loosely surround the rods 25 and have an overhanging threaded portion 41, as shown in Fig. 2, through which a screw 42 extends which enters a groove 43 longitudinally in the upper surface of the rear portion of the levers 23. When the device is taken away from the automobile, the screws 42 are released and the brackets 40 will turn on the rods 25.

The modified form is shown in Fig. 3, where a hooked portion 44 of the bracket 40 engages a slot or recess 45 in the lever 23. The idle position of the bracket 40 is indicated by the dotted lines in Fig. 3. There is also shown in Fig. 5 an ordinary hooked bracket 46 loosely placed on the rod 25 so that it can be turned up and caught over the lever 23, if desired.

In use the power transmission device is placed at the rear end of the automobile and the levers 23 inserted under the axle, and then the automobile and axle are lifted until the wheels are off the ground, and the levers 23 are held in such position by the brackets 40. The nuts 33 are tightened up so as to bring the friction wheels 30 against the rubber tire of the automobile wheels, and the automobile engine is started, and power is transmitted through the belt 129 in the device which is to be driven. If it is desired to drive only one friction wheel 30, the swiveled bearing 27 will enable the shaft 28 to be adjusted so that only one friction wheel will touch the rear wheels of the automobile. If it be desired only to run the automobile engine a while to get it heated and well under way before starting the automobile, the device performs the part of a jack. In that instance the friction wheels 30 need not be brought in touch with the automobile wheels.

In Fig. 6 a modified form of the lever 23 is shown, with two bosses 50 and 51 on the sides through which two screws 52 and 53 extend. A wooden block 54 is secured to the upper end of the screws 52 and 53 in position to receive the shaft 14. By means of the screws the block may be elevated to center the shaft 10 in relation to the shaft 28.

I claim as my invention:

1. A power transmission device adapted to receive power from the driven traction wheels of a vehicle while said vehicle is stationary which includes a frame separate from the vehicle and adapted to be located between said vehicle wheels, means on said frame for elevating the axle of the vehicle so the wheels will clear the ground, a shaft mounted on said frame so as to be slidable toward the vehicle wheels, friction wheels secured on the said shaft in position to engage and be driven by the vehicle wheels, and means for transmitting power from said shaft.

2. A power transmission device adapted to receive power from the driven traction wheels of a vehicle while said vehicle is stationary which includes a frame adapted to be located between the wheels of the vehicle, rods extending rearwardly therefrom near each end of the frame, a shaft slidably mounted on said rods, friction wheels mounted on said shaft and adapted to engage the peripheries of the vehicle wheels, and springs adjustably mounted on said rods for acting against the shaft bearings, whereby said friction wheels will be forced against the vehicle wheels.

3. A power transmission device adapted to receive power from the driven traction wheels of a vehicle while said vehicle is stationary which includes a frame adapted to be located between the wheels of a vehicle, rods extending rearwardly from the upper part thereof, sleeves slidable thereon, bearings swiveled in said sleeves, a shaft mounted on said rods, friction wheels mounted on said shaft in position to engage the vehicle wheels, spiral springs on the outer ends of said rods, and nuts which screw up on said rods against said springs for regulating the tension.

4. A power transmission device adapted to receive power from the driven traction wheels of a vehicle while said vehicle is stationary which includes a frame adapted to be placed between the wheels of a vehicle, a lever fulcrumed on the upper part of the frame at each end with one end of each lever adapted to extend under and partially embrace the axle of the vehicle, means in connection with said frame for holding the outer ends of said lever down when the axle of the vehicle is elevated, a shaft mounted on said frame, and friction wheels on said shaft in position to engage the vehicle wheels.

5. A power transmission device adapted to receive power from the driven traction wheels of a vehicle while said vehicle is stationary which includes a frame adapted to be located between the wheels of the vehicle, levers fulcrumed between their ends and their inner ends adapted to extend under and embrace the axle of the vehicle, rods extending rearwardly from the upper part of said frame, brackets mounted on said rods in position to hold down the outer ends of said levers when the axle of the vehicle is elevated, a shaft on said rods, and friction wheels on said shaft in position to engage the wheels of the vehicle.

6. A power transmission device adapted to receive power from the driven traction wheels of a vehicle while said vehicle is stationary which includes a frame adapted to be located between the wheels of a vehicle and having an upward extension from each end provided with a vertical series of holes, levers provided with fulcrum pins between their ends adapted to be inserted in any of said holes and with their inner ends extending under and embracing the axle of the vehicle, means in connection with said frame for holding the outer ends of said levers down when the axle of the vehicle is elevated, a shaft mounted on said frame, and friction wheels on said shaft in position to engage the vehicle wheels.

7. A power transmission device adapted to receive power from the driven traction wheels of a vehicle while said vehicle is stationary which includes a frame adapted to be placed between the wheels of a vehicle, a lever fulcrumed on the upper part of the frame at each end with one end of each lever adapted to extend under and partially embrace the axle of the vehicle, a pair of oppositely and diagonally positioned lateral extensions on said levers, and removable bars adapted to be inserted in connection with said levers and between said extensions for operating the levers, means in connection with said frame for holding the outer ends of said lever down when the axle of the vehicle is elevated, a shaft mounted on said frame, and friction wheels on said shaft in position to engage the vehicle wheels.

In witness whereof, I have hereunto affixed my signature in the presence of the witnesses herein named.

THOMAS NESOM.

Witnesses:
O. M. McLaughlin,
G. H. Boink.